US007118908B2

(12) United States Patent
Jan et al.

(10) Patent No.: US 7,118,908 B2

(45) **Date of Patent: *Oct. 10, 2006**

(54) ON-SPOT SELECTIVELY ACTIVATED HYDROPHOBIC SLIDE AND PREPARATION THEREOF

(75) Inventors: Bor-Iuan Jan, No. 5, Lane 373, Chung-Hua Rd., Pingtung (TW); Jia-Huey Tsao, Taoyuan (TW); Chih-Wei Ho, Miaoli (TW); Chao-Chi Pan, Hsinchu (TW)

(73) Assignee: Bor-Iuan Jan, Pingtung (TW)

( * ) Notice: Subject to any disclaimer, the term of this patent is extended or adjusted under 35 U.S.C. 154(b) by 744 days.

This patent is subject to a terminal disclaimer.

(21) Appl. No.: 10/189,405

(22) Filed: Jul. 8, 2002

(65) Prior Publication Data

US 2002/0182719 A1 Dec. 5, 2002

Related U.S. Application Data

(63) Continuation-in-part of application No. 10/115,103, filed on Apr. 4, 2002, now abandoned, which is a continuation-in-part of application No. 09/695,254, filed on Oct. 25, 2000, now Pat. No. 6,403,368.

(51) Int. Cl.

| | |
|---|---|
| ***C12M 1/34*** | (2006.01) |
| ***G01N 33/53*** | (2006.01) |
| ***C07H 21/02*** | (2006.01) |
| ***C12Q 1/68*** | (2006.01) |
| *G01N 33/566* | (2006.01) |

(52) U.S. Cl. ........................ 435/287.9; 435/6; 435/7.1; 435/183; 436/501; 436/527; 436/528; 436/532; 536/23.1; 536/24.3

(58) Field of Classification Search ............ 435/287.2, 435/7.1, 6, 183; 436/527, 532, 501, 528; 536/23.1, 24.3

See application file for complete search history.

(56) References Cited

U.S. PATENT DOCUMENTS 5,272,042 A * 12/1993 Allen et al. .............. 430/270.1

5,445,934 A * 8/1995 Fodor et al. ................... 435/6

* cited by examiner

*Primary Examiner*—Mary E. Ceperley

*Assistant Examiner*—Shafiqul Haq

(74) *Attorney, Agent, or Firm*—Fei-Fei Chao; Bingham McCutchen LLP

(57) ABSTRACT

An on-spot selectively activated hydrophobic slide/microarray. The preparation method relates to a hydrophobic copolymer prepared by blending, grafting or co-polymerization of a hydrophobic material and a compound bearing a functional group protected by a protecting group, wherein the functional group is imide or cyclic amide, and the protecting group is a photo acid group such as a tosyloxy group. The hydrophobic copolymer coated on a substrate is then subjected to selective photolithographical activation so that the slide will have functional active copolymer spots separated by inactive copolymers. The resulting slide is suitable for the preparation of high-density and high-efficiency bio-chip/microarray.

13 Claims, 2 Drawing Sheets

Non-*hv* Unwashed

Washed

*hv* 248nm Unwashed

Washed $AlO_3$ $O_3$ $P_3$

2SSC,pH7

3SSC,pH7

10SSC,pH3

ON-SPOT SELECTIVELY ACTIVATED HYDROPHOBIC SLIDE AND PREPARATION THEREOF

CROSS REFERENCE TO RELATED APPLICATION

This application is a continuation-in-part of the continuation-in-part application Ser. No. 10/115,103 now abandoned which is a continuation-in-part of U.S. patent application Ser. No. 09/695,254 filed on Oct. 25, 2000 now U.S. Pat. No. 6,403,368, which hereby incorporated by reference.

BACKGROUND OF THE INVENTION

1. Field of the Invention

The present invention relates to an on-spot selectively activated hydrophobic slide/microarray and the preparation method thereof. More particularly, it relates to a hydrophobic copolymer prepared by blending, grafting or co-polymerization of a hydrophobic material and a compound bearing functional groups protected by a protecting group. The hydrophobic copolymer is coated on a substrate and subjected to selective photolithographical activation to form an on-spot selectively activated hydrophobic slide. The slide can then be used to produce an on-spot selectively activated hydrophobic microarray.

2. Description of the Related Arts

In current biochip and bio-microarray technology, most preparation methods involve the treatment of a matrix surface with silanization, followed by crosslinking reaction with biomaterials. In the silanization treatment, the surface of the substrate is activated based on its material, and then treated by a hydrophilic silane such as APTES (amino-propyl-tetraethoxy-silane). Afterwards, the crosslinking reaction is performed via a crosslinker such as glutaraldehyde to immobilize biomaterials on the substrate. The shortcomings of this method include substrate dependence, long reaction time, poor homogeneity, low reaction efficiency, and the resulting low activity for the immobilized biomaterials. Moreover, the prepared covalent bonding surface is hydrophilic, which facilitates crossover and contamination among spots when the hydrophilic surface is used for a high-density microarray.

U.S. Pat. No. 5,837,860 and WO 98/39481 disclose the treatment of glass or silicon wafer with hydrophobic silane such as mercapto-silane, and the immobilization of nucleic acid probes thereon. The method involves treating a substrate surface so that mercapto-groups (HS-) with hydrophobicity are covalently bonded thereon. The hydrophobic property is suitable for the immobilization of nucleic acids/nucleotides in high density. The method, however, requires the modification of the biomaterials to bear mercapto-groups, thereby forming disulfide bonds between the modified biomaterials and matrix surface. Blanchar, A. P. et al. (Biosensors and Bioelectronics, 1996, 11(6/7): 687–690) discloses coating photoresists onto a substrate and then development using the micro-electromechanical mask to form on-spot hydrophilic spots, wherein the region outside of the spots is hydrophobic. The preparation of high-density nucleic acid probe microarrays and in situ synthesis is carried out on this treated surface.

In this prior art, blending, grafting or co-polymerization of a hydrophobic material and a compound bearing functional groups such as imide, cyclic amide, and to prepare a hydrophobic copolymer is not disclosed. Further, the application of the prepared hydrophobic copolymer onto an organic or inorganic substrate to form an on-spot hydrophilic enhanced slide is also not disclosed.

SUMMARY OF THE INVENTION

It is therefore a primary object of the present invention to provide an on-spot selectively activated hydrophobic slide that allows highly efficient manufacturing of high-density microarray. The slide of the present invention comprises a substrate on which a hydrophobic copolymer layer is coated. The hydrophobic copolymer layer comprises functional active copolymer spots separated by inactive copolymer. The functional active copolymer comprises a hydrophobic material and a compound bearing a functional group which is imide or cyclic amide. The inactive copolymer comprises a hydrophobic material and a compound bearing a functional group protected by a protecting group, wherein the functional group is imide or cyclic amide, and the protecting group is a photo acid group. Photo acids are acid groups that are sensitive to light of specific wave length and will convert into other compounds when expose to the light. Examples of photo acid groups include, sulfonyloxy group, N-methanesulfonyloxy group, N-trifluoro-methanesulfonyloxy group, camphorsulfonyloxy group and tosyloxy group.

Another aspect of the present invention provides an on-spot selectively activated hydrophobic microarray comprising a substrate coated with a hydrophobic copolymer layer having functional active copolymer spots separated by inactive copolymers, and a biologically active material immobilized on the functional active copolymer spots. The functional active copolymer comprises a hydrophobic material and a compound bearing a functional group which is imide or cyclic amide. The inactive copolymer comprises a hydrophobic material and a compound bearing a functional group protected by a protecting group, wherein the functional group is imide or cyclic amide, and the protecting group is a photo acid group.

Yet another aspect of the present invention provides a method for preparing an on-spot selectively activated hydrophobic slide with the following steps. First, a hydrophobic copolymer is prepared in a solvent to obtain a solution of hydrophobic copolymer. The solution of hydrophobic copolymer is then coated on a substrate (e.g. an organic or inorganic substrate). The solvent is then removed. The hydrophobic copolymer layer on the substrate is subjected to selective photolithographical activation to form a hydrophobic copolymer layer having functional active copolymer spots separated by inactive copolymers.

BRIEF DESCRIPTION OF THE DRAWINGS

The present invention will be more fully understood and further advantages will become apparent when reference is made to the following description of the invention and the accompanying drawings in which.

DETAILED DESCRIPTION OF THE INVENTION

Figure 1:
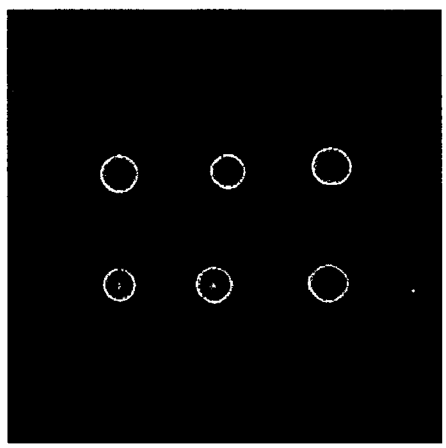
FIG. 1 is a diagram showing the fluorescent intensity after immobilization of labeled oligonucleotide probe using a glass slide coated with poly(styrene-co-[N-(tosyloxy)maleimide]) without photolithographical activation as a matrix.

The present invention features a method for preparing an on-spot selectively activated hydrophobic slide with the following steps. First, a hydrophobic copolymer is prepared in a solvent to obtain a solution of hydrophobic copolymer. The solution of hydrophobic copolymer is then coated on a substrate (e.g. organic or inorganic substrate). The solvent is then removed. The hydrophobic copolymer layer on the substrate is then subjected to selective photolithographical activation to form a hydrophobic copolymer layer having functional active copolymer spots separated by inactive copolymer (ie., the hydrophobic copolymer).

In accordance with the method of the present invention, the hydrophobic copolymer is prepared by blending, grafting or co-polymerization of a hydrophobic material and a compound bearing a functional group protected by a protecting group. Examples of the functional group are imide or cyclic amide. The protecting group is a photo acid group such as sulfonyloxy group, N-methanesulfonyloxy group, N-trifluoro-methanesulfonyloxy group, camphorsulfonyloxy group and tosyloxy group, preferrable is tosyloxy group. The hydrophobic copolymer solution is then coated onto an organic or inorganic substrate followed by removing the solvent to form a hydrophobic layer with covalent bonding functional groups protected by the protecting groups. The resulting hydrophobic layer is comparatively inert due to the existence of the large protecting group.

During the photolithographical activation step, the hydrophobic layer is covered with a photo mask that selectively exposes predetermined areas (or spots) of the hydrophobic layer. These exposed areas of the hydrophobic copolymer layer are subject to photolithographical activation with light at an appropriate wavelength to remove the protecting groups from the functional groups of the hydrophobic copolymers. The resulting functional active copolymers have functional groups capable of forming covalent bond with biological materials. The hydrophobic copolymers covered by the photo mask maintain the protected form and are inert to react with biological materials. Therefore, when a microarray is prepared using such slide, the biological material will only bind to the functional active copolymer spots but not to the inactive areas between the spots.

A main feature of the present invention is that the functional active copolymer spots are separated by inactive copolymers. With the application of the photo mask and photolithographical activation, the distance between the spots can be reduced without mixing materials to be immobilized on different spots. The density of spots of a resulting microarray is therefore largely increased.

In addition, the covalent bonding reaction between the functional active copolymer and the biological material is reduced to one-step reaction so that the immobilization efficiency is improved. Further, the compounds bearing functional groups (e.g. imide or cyclic amide) or the derivatives thereof protected with the protecting groups can be blended, grafted, or co-polymerized with hydrophobic material in various ratios to adjust the density of functional groups on the resulting functional hydrophobic copolymer spots.

Another feature of the present invention is that when the structure of imide or cyclic amide is attacked by a biomaterial or a modified nucleophile, another hydrophilic group will be formed resulting in the formation of on-spot hydrophilic enhancement. It is therefore beneficial to enhance not only the covalent bonding on the microarray but also the specificity of subsequent biochemical reaction, thereby improving the choke point of the traditional hydrophilic silanization.

The term "on-spot hydrophilic enhanced" used herein refers to the formation of another hydrophilic group via ring-opening when the structure of imide or cyclic amide on the hydrophobic matrices prepared by the present invention is attacked by a nucleophile (e.g. amine modified oligonucleotide probe), which leads to the formation of on-spot hydrophilic enhancement. At this point, the hydrophobic surface is converted to hydrophilic, whereas the other region remains hydrophobic.

When the protected hydrophobic copolymer is poly(styrene-co-[N-(tosyloxy)maleimide]) and the functional hydrophobic copolymer is PSMI, the aforementioned reactions are shown as Scheme I:

Scheme I:

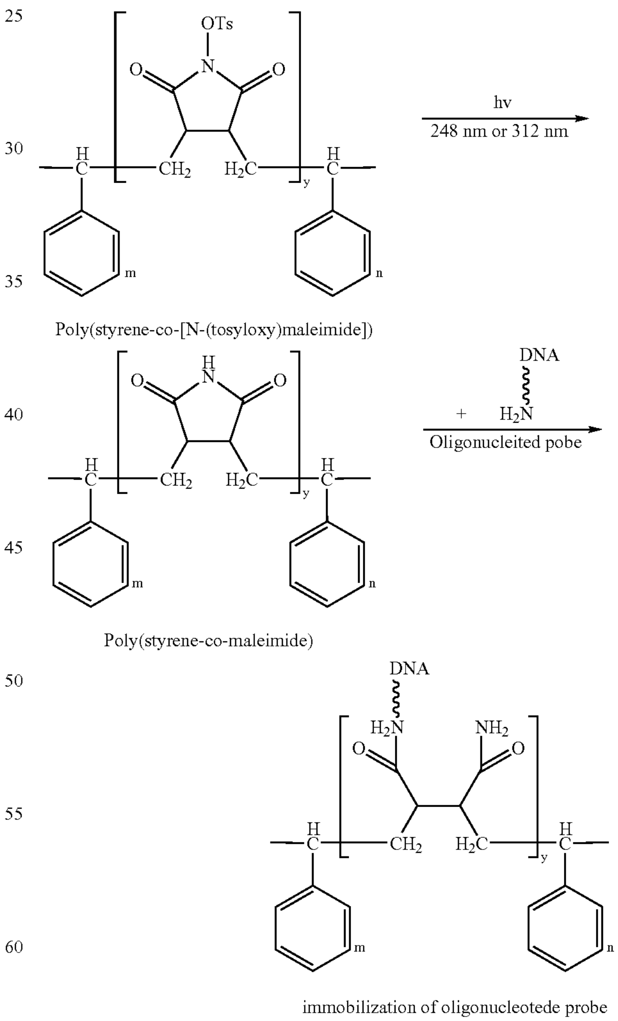

Unless otherwise defined, all technical and scientific terms used herein have the same meaning as commonly understood by one of ordinary skill in the art to which this invention belongs. In addition, the abbreviations throughout the specification have the following meanings: APTES, amino-propyl-tetraethoxy-siliane; PS, polystyrene; MI, maleimide; PSMI, poly(styrene-co-maleimide); PE, polyethylene; PEMI, poly(ethylene-co-maleimide); Ts, tosyloxy group; TsCl, toluenesulfonic acid chloride; TsOMI, N-(tosyloxy)maleimide; IPA, isopropyl alcohol; and AIBN, N,N'-azobisisobutyronitrile. The chemical formula of Ts group is shown as following:

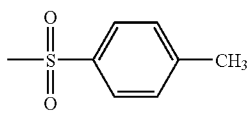

According to the method for preparing an on-spot selectively activated hydrophobic slide of the present invention, the type of the substrate used herein is not limited, and can include an organic or inorganic substrate (i.e. substrate-independent). Organic substrates include a polymer polymerized by organic monomers. Suitable organic monomers include, for example, ethylene, styrene, propylene, ester, acrylic acid, acrylate, alkyl acrylic acid, or alkyl acrylate. Inorganic substrates include, but are not limited to, silicon wafer, ceramic material, glass or metal. The substrate can further comprises a polymer consisting of poly(styrene-co-maleimide), or poly(ethylene-co-maleimide) if desired. Also, the substrate can further comprises a photoactive polymer having a photo acid group if desired.

In one preferred embodiment, the hydrophobic copolymer prepared by the present invention (as described below) can be directly molded by injection or compression to form an on-spot hydrophilic enhanced slide with hydrophobic surface, wherein the technique of injection or compression molding is well known to those skilled in this art. Suitable hydrophobic copolymers used herein include, but are not limited to, poly(styrene-co-maleimide).

If an inorganic substrate is employed, an activation of the substrate surface can be carried out prior to coating hydrophobic copolymers thereon to enhance the adhesion between the substrate surface and hydrophobic copolymers. The activation step includes treatment of the substrate surface with an acid or a base, or treatment of the surface by plasma activation.

According to the preparation method of the invention, the substrate surface can be cleaned prior to coating hydrophobic copolymers thereon to prevent the deposition of impurities or contaminants on the substrate surface. The cleaning step is performed by pretreatment with a solvent and/or sonication, based on the material of the substrate. Suitable solvents include, but are not limited to, surfactant, water, alcohol or acetone.

In accordance with the present invention, the hydrophobic copolymer is prepared by blending, grafting or co-polymerization of a hydrophobic material and a compound bearing a functional group protected by a protecting group, wherein the functional group is imide or cyclic amide, and the protecting group is a photo acid group such as sulfonyloxy group, N-methanesulfonyloxy group, N-trifluoro-methanesulfonyloxy group, camphorsulfonyloxy group and tosyloxy group, preferrable is tosyloxy group. The hydrophobic material can include any compound that blends, grafts or copolymerizes with an imide, such as maleimide, 4-aminophthalimide; or cyclic amide, such as 3-methyl-2-pyridone. Such hydrophobic materials include styrene, urethane, ethylene, or derivatives thereof. In a particularly preferred embodiment of the present invention, the hydrophobic material used is polystyrene or ethylene, and the prepared hydrophobic copolymers thus include PSMI, or PEMI.

The method for coating the hydrophobic copolymer onto a matrix is not limited, and is understood by one of ordinary skill in the art to which chemical engineering and semiconductor process belongs, to include spin coating, screen printing, roller coating, curtain coating, or dip coating, etc. In one preferred embodiment, the coating method used herein is spin coating, preferably at 3,000–6,000 rpm, and more preferably at 4,000 rpm.

After coating the hydrophobic copolymer onto a substrate, the excess solvent is removed by means of, for example, vacuum evaporation, heating evaporation, or evaporation under reduced pressure, wherein the method of heating evaporation is carried out at a temperature not higher than 100° C. to prevent the matrix from being destroyed or to prevent undesired polymerization. The preparation of the slide of the invention is accompanied after the solvent is removed.

The hydrophobic copolymer coated on the substrate is then subjected to selective photolithographical activation. In the present invention, the protecting group is a photo acid such as sulfonyloxy group, N-methanesulfonyloxy group, N-trifluoro-methanesulfonyloxy group, camphorsulfonyloxy group and tosyloxy group, preferrable is tosyloxy group, and the protected functional groups of the hydrophobic copolymer is very inert to biological materials. In the present invention, the preferred wavelength of the light used for photolithographical activation is 248 nm or 312 nm. The functional group of the hydrophobic copolymer is activated by appropriate photolithography, which removes the protecting group from the functional group of the hydrophobic copolymer and thus activate the functional group. The functional active group is capable of forming covalent bond(s) with a biological material.

In a preferred embodiment of the present invention, a photo mask is used during the photolithographical activation process to define the areas (spots)to be activated. When different biological materials are to be immobilized on one slide to form a microarray, different photo masks can be used. That is, for the first biological material, predetermined spots on the hydrophobic copolymer layer are activated using a first photo mask followed by immobilization of the first biological material, and then a second photo mask is used to activate spots on which the second biological material is immobilized, and so on. An advantage of this selective photolithographically activated slide is that the activated and thus functional active copolymer spots are separated by inactive (ie., protected) hydrophobic copolymers, and therefore greatly increases the density of the resulting microarray. The employment of photo mask(s) also facilitates the manufacture of high density microarray.

In another aspect of the present invention, an on-spot selectively activated hydrophobic microarray is provided. The microarray comprises a biologically active material, which is immobilized on the on-spot selectively activated hydrophobic slide described above. The immobilization is achieved by way of contacting the bio-molecules with the on-spot selectively activated hydrophobic of the present invention. The biologically active material has a nucleophile, such as an amine group, present in the molecule (e.g. a protein) itself or in a chemically-modified entity thereof. The linkage between the nucleophile of the biologically active material and functional groups of the functional active copolymer is formed via the ring-opening reaction.

Bio-molecules used as the biologically active material that are suitable for use in the invention include nucleic acid, oligonucleotide, peptide nucleic acid (PNA), antigen, antibody, enzyme, or protein. Stable amide linkages are formed after such bio-molecules are reacted with the functional groups of the on-spot hydrophilic enhanced slide of the invention. As compared with the prior arts in which the bonding is created via a two-step reaction (i.e., by the silane-based polymer and followed by adding a crosslinker such as glutaldehyde), the reaction is reduced to one-step reaction in the present invention. Thereby, the time for the immobilization reaction is substantially decreased and efficiency is increased.

Another feature of the present invention is the property of on-spot hydrophobic/hydrophilic dynamic conversion when the slide is applied to immobilization of the biomaterials. In addition, a high-density microarray can be prepared according to the matrix with a functional layer of hydrophobic characteristic, and the biomaterials' orientation during subsequent reaction can be improved by way of the on-spot hydrophilic conversion. Further, the preparation time according to the method of the invention is much less than that of the conventional method, and the homogeneity of the slide of the present invention is increased. In other words, the number of the functional groups (e.g. imide or cyclic amide) appearing on the matrix and the bonding strength is average. Moreover, the on-spot hydrophilic enhanced microarray of the present invention can markedly decrease the time required for immobilization of biomaterials onto the matrix. In one preferred embodiment, the immobilization time is less than 40 minutes.

Without intending to limit it in any manner, the present invention will be further illustrated by the following examples.

EXAMPLE 1

Preparation of TsOMI 0.25 g N-hydroxymaleimide and 0.5 g TsCl are mixed in 50 ml toluene/IPA solution. The reaction mixture was heated to 60° C. and allowed to react in the presence of $N_2$ for 3 hours to give TsOMI solution.

EXAMPLE 2

Preparation of Poly(Styrene-co-[N-(tosyloxy)Maleimide])

The procedure for preparing poly(styrene-co-[N-(tosyloxy)maleimide]) is shown in Scheme II:

Scheme II:

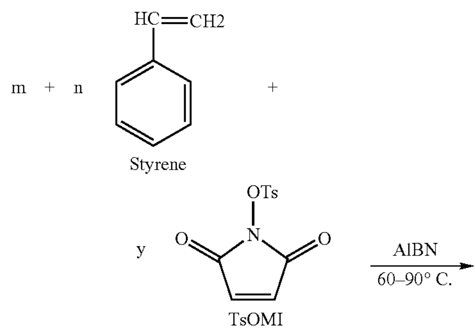

-continued

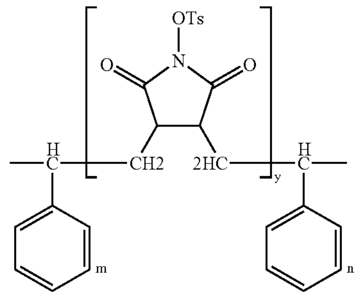

Poly(styrene-co-[N-(tosyloxy)maleimide])

To a pre-filled nitrogen or argon reaction bottle containing toluene, polystyrene and TsOMI were added in a molar ratio of 4:1, followed by addition of 0.5% N,N'-azobisisobutyronitrile (AIBN) dropwise. The co-polymerization was conducted at 60° C. for 2 hours, and then ceased by aeration to obtain poly(styrene-co-[N-(tosyloxy)maleimide]) in toluene.

EXAMPLE 3

Effectiveness of Oligonucleotide Immobilization of Poly (Styrene-co-[N-(tosyloxy)Maleimide])

Poly(styrene-co-[N-(tosyloxy)maleimide]) synthesized from Example 2 was dissolved in toluene and then coated on glass slides at 4,000 rpm to form poly(styrene-co-[N-(tosyloxy)maleimide]) slides. The slides were dried in an oven at 100° C. to remove toluene. A synthetic oligonucleotide probe in which the 5' end was labeled with fluorescence and the 3' end bore amine group, was immobilized to the aforementioned slides to perform a ring-opening reaction. The immobilization conditions were described as follows: 0.5 μM of the probe in 2×SSC buffer (pH 7.0) was spotted on the slides and incubated at 37° C. for 1 hour. The slides were washed with 0.2% SDS for 10 minutes. The fluorescence analyses were performed for the slides with and without washing (control) to monitor the immobilization efficiency. The result is shown in FIG. 1. It is shown that the amount of oligonucleotide probes immobilized on poly (styrene-co-[N-(tosyloxy)maleimide]) is very low.

EXAMPLE 4

Effectiveness of Oligonucleotide Immobilization of Poly (Styrene-co-maleimide)

Figure 2:
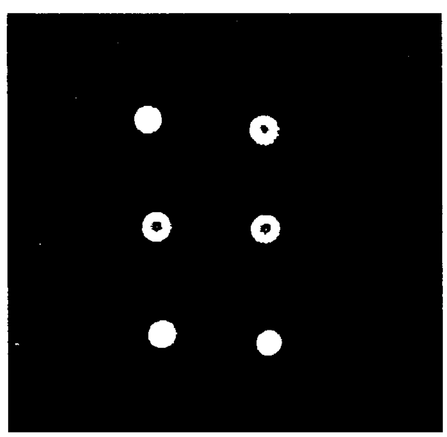
FIG. 2 is a diagram showing the fluorescent intensity after immobilization of labeled oligonucleotide probe using a glass slide coated with poly(styrene-co-[N-(tosyloxy)maleimide]) with photolithographical activation as a matrix.
Figure 2:
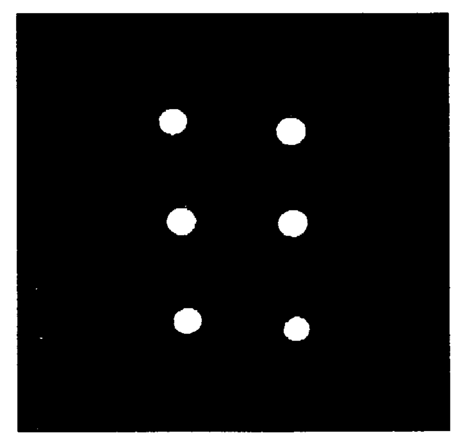

Poly(styrene-co-[N-(tosyloxy)maleimide]) slides were prepared as described in Example 3. After the toluene dried, the slides were exposed to a light of 248 nm wavelength for 10 minutes to convert poly(styrene-co-[N-(tosyloxy)maleimide])to PSMI. Next, a synthetic oligonucleotide probe was immobilized on the slides as described in Example 3 to perform a ring-opening reaction. The fluorescence analyses were performed for the slides with and without washing (control) to monitor the immobilization efficiency. The result is shown in FIG. 2. It is shown that the amount of oligonucleotide probes immobilized on poly(styrene-co-maleimide) is much higher compared with the results from Example 3.

EXAMPLE 5

Hybridization with Specific Oligonucleotides

The slides used in this Example were the same as those described in Example 4. The oligonucleotides used in this example were $AlO_3$ (composed of 29 nucleotides with 15 Thymidines and amine group at the 5' end); $O_3$ (composed of 29 nucleotides without amine group at the 5' end); and $P_3$ (composed of 29 nucleotides with amine group at the 5' end), respectively. The probe used for labeling hybridization reaction was the complementary sequence thereto, wherein the 3' end was labeled with fluorescence. The immobilization conditions were 2×SSC, pH 7.0; 3×SSC, pH 7.0; and 10×SSC, pH 3.0, respectively, and the immobilization time was 1 hour. The hybridization reaction was performed for 4 hours. The fluorescence was analyzed to monitor the hybridization result. The result is shown in FIG. 3.

The functional active copolymers of the present invention, namely PSMI, and PEMI, persist reaction functionalities (e.g. imide ring) to which the biomaterials can be bonded, and therefore a bio-molecule such as amine-modified DNA can be stably bonded to the surface of the slides. In FIG. 1, since poly(styrene-co-[N-(tosyloxy)maleimide]) has its functional site(s) protected by a large photo acid group, tosyloxy, most of the oligonucleotide probes did not form stable bonding with the copolymer and were washed out after washing. As compared with the photolithographically activated slides on which poly(styrene-co-[N-(tosyloxy)maleimide]) has been converted to PSMI (FIG. 2), the oligonucleotide probe retains at least 90% immobilization efficiency after washing with 0.2% SDS.

In traditional methods, the immobilization of oligonucleotide probe often requires 4–16 hours. However, by the method of the present invention, only about 30 minutes is required to achieve the same effect of probe immobilization. This gives the present invention another significant advantage over the prior techniques.

Figure 3:
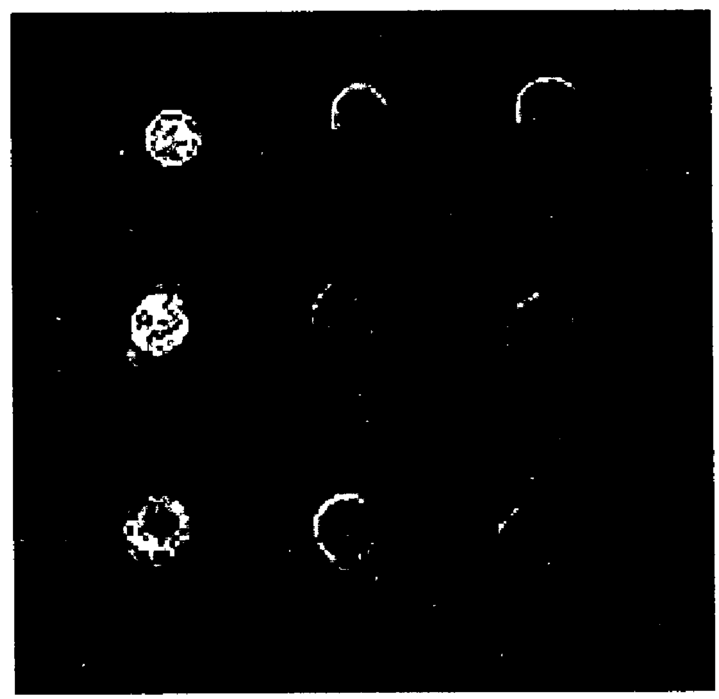
FIG. 3 is a diagram showing the fluorescent intensity of three different oligonucleotide probes hybridized with their targets respectively, wherein the oligonucleotide probes are immobilized on a glass slide coated with poly(styrene-co-[N-(tosyloxy)maleimide]) and treated by photolithographical activation.

In FIG. 3, three different probes were tested for their effectiveness on a photolithographically activated slide. The $AlO_3$ probe is composed of 29 nucleotides with 15 Thymidines and amine group at the 5' end, the $O_3$ probe is composed of 29 nucleotides without amine group at the 5' end, and the $P_3$ probe composed of 29 nucleotides with amine group at the 5' end. These probes were immobilized on a photolithographically activated slide at pH 3.0 and 7.0, respectively. Poor bonding efficiency of $O_3$ probe was observed due to the lack of an amine group at its 5' end. Other probes with amine group at the 5' end possessed excellent bonding efficiency. The result indicates that bonding specificity of a target molecule can be elevated markedly through the presence of a 5' end amine group at the corresponding probe.

The density of functional groups of the functional active copolymer spots is adjustable by adjusting the proportions of hydrophobic material and protected functional compounds during the synthesis of the hydrophobic copolymer. When the density of a functional group increases, the immobilization efficiency is also increased. On the other hand, the copolymer becomes more hydrophilic, which is not desirable in the preparation of high density microarray. Therefore, the density of functional groups in the hydrophobic copolymer layer should be adjusted according to different conditions.

Homogeneity is also an important fact in the preparation of microarrays. The hydrophobic copolymer of the present invention has been shown to have excellent homogeneity after coating to the substrate.

The component of the hydrophobic copolymer is not limited to styrene/polystyrene. The copolymer with polyethylene (PE) as the main chain can also be developed into an on-spot hydrophilic enhanced slide. Any functionally hydrophobic copolymer containing at least one imide or cyclic amide can attain the purpose of the present invention.

While the invention has been particularly shown and described with the reference to the preferred embodiment thereof, it will be understood by those skilled in the art that various changes in form and details may be made without departing from the spirit and scope of the invention.

What is claimed is:

1. An on-spot selectively activated hydrophobic microarray, comprising:

a substrate;

a hydrophobic copolymer layer coated on the substrate;

wherein the hydrophobic copolymer layer comprises spots containing a functionally active copolymer having at least a functional group capable of forming a covalent bond with a biologically active material;

wherein the spots are separated by an inactive copolymer which is inert to react with the biologically active material;

wherein the functionally active copolymer comprises a hydrophobic material and a compound bearing a functional group which is imide or cyclic amide, and the inactive copolymer comprises a hydrophobic material and a compound bearing the functional group protected by a protecting group, wherein the functional group is imide or cyclic amide, and the protecting group is a photo acid group;

wherein the functionally active copolymer is formed by removing the protecting group from the functional group of the inactive copolymer; and wherein the biologically active material comprises a nucleophile immobilized to the functional active copolymer via a ring-opening reaction between the functional group of the functionally active copolymer and the nucleophile of the biologically active material.

2. The microarray as claimed in claim 1, wherein the protecting group of the inactive copolymer is a photo acid group which is one selected from the group consisting of a sulfonyloxy group, an N-methanesulfonyloxy group, an N-trifluoro-methanesulfonyloxy group, a camphorsulfonyloxy group, and a tosyloxy group.

3. The microarray as claimed in claim 2, wherein the photo acid group is a tosyloxy group.

4. The microarray as claimed in claim 1, wherein the hydrophobic material is styrene, urethane, ethylene, or derivatives thereof.

5. The microarray as claimed in claim 1, wherein the functional active copolymer is poly(styrene-co-maleimide) or poly (ethylene-co-maleimide).

6. The microarray as claimed in claim 1, wherein the inactive copolymer is poly (styrene-co-[N-(tosyloxy)-maleimide]) or poly(ethylene-co-[N(tosyloxy)-maleimde]).

7. The microarray as claimed in claim 1, wherein the substrate is a polymer polymerized by organic monomers, wherein the organic monomers are ethylene, styrene, propylene, ester, acrylic acid, acrylate, alkyl acrylic acid, or alkyl acrylate.

8. The microarray as claimed in claim 1, wherein the substrate is an inorganic material of silicon wafer, ceramic material, glass, or metal.

9. The microarray as claimed in claim 1, wherein the biologically active material comprises nucleic acid, oligonucleotide, peptide, peptide nucleic acid, antigen, antibody, enzyme, or protein.

10. The microarray as claimed in claim 1, wherein the protective group of the inactive copolymer is removed to form the functional active copolymer by photolithographical activation with light.

11. The microarray as claimed in claim 10, wherein the photolithographical activation is at a wavelength of about 248 nm or about 312 nm.

12. The microarray as claimed in claim 1, wherein the imide is maleimide or 4-amino-phthalimide.

13. The microarray as claimed in claim 1, wherein the cyclic amide is 3-methyl-2-pyridone.

* * * * *

UNITED STATES PATENT AND TRADEMARK OFFICE

CERTIFICATE OF CORRECTION

PATENT NO. : 7,118,908 B2
APPLICATION NO. : 10/189405
DATED : October 10, 2006
INVENTOR(S) : Bor-Iuan Jan et al.

It is certified that error appears in the above-identified patent and that said Letters Patent is hereby corrected as shown below:

On Title Page item (73) Assignee:

Replace "Bor-Iuan Jan, Pingtung (TW)" with --Industrial Technology Research Institute, Chutung, Hsinchu, Taiwan, R.O.C.--

Signed and Sealed this

Fourth Day of December, 2007

JON W. DUDAS

*Director of the United States Patent and Trademark Office*